United States Patent [19]

Schierling et al.

[11] Patent Number: 5,476,166
[45] Date of Patent: Dec. 19, 1995

[54] FLYWHEEL AND CLUTCH SYSTEM FOR A MOTOR VEHICLE

[75] Inventors: Bernhard Schierling, Kürnach; Hilmar Göbel, Grafenrheinfeld, both of Germany

[73] Assignee: Fichtel & Sachs AG, Schweinfurt, Germany

[21] Appl. No.: 221,372

[22] Filed: Mar. 31, 1994

[30]   Foreign Application Priority Data

Apr. 3, 1993 [DE] Germany ............... 43 11 102.5

[51] Int. Cl.$^6$ ................ F16D 13/60; F16F 15/12; F16F 15/30
[52] U.S. Cl. ............... 192/70.14; 29/434; 74/574; 192/70.17
[58] Field of Search ............... 192/70.14, 70.17, 192/70.18, 70.19, 70.2, 70.13, 70.27; 74/574, 572; 29/434

[56]             References Cited

U.S. PATENT DOCUMENTS

| 1,506,875 | 9/1924 | Wood | 192/70.19 |
|---|---|---|---|
| 1,976,063 | 10/1934 | Evans | 192/70.18 |
| 3,061,062 | 10/1962 | Smirl | 192/70.18 |
| 3,174,602 | 3/1965 | Schjolin | 192/70.14 |
| 4,836,351 | 6/1989 | Janiszewski | 192/70.19 X |
| 4,889,009 | 12/1989 | Friedmann et al. | 74/572 X |
| 5,058,719 | 10/1991 | Flotow et al. | 192/70.19 |
| 5,358,086 | 10/1994 | Muller et al. | 192/70.14 |

FOREIGN PATENT DOCUMENTS

| 2161432 | 6/1972 | Germany. |
|---|---|---|
| 2815803 | 2/1979 | Germany. |
| 615826 | 1/1949 | United Kingdom. |
| 943039 | 11/1963 | United Kingdom. |
| 1126299 | 9/1968 | United Kingdom. |
| 2211454 | 7/1989 | United Kingdom. |

*Primary Examiner*—Rodney H. Bonck
*Attorney, Agent, or Firm*—Nils H. Ljungman & Associates

[57]            ABSTRACT

A flywheel of an internal combustion engine, wherein the flywheel has a reduced outside diameter. The flywheel has lugs which point radially inward, which lugs facilitate the fastening of the flywheel to the clutch housing. It is thereby possible to locate the threaded fasteners on a smaller average diameter of the flywheel. The clutch disc has a maximum and a minimum outside diameter, to guarantee that it can be installed past the lugs. In particular when this type of flywheel is installed in a flywheel with two centrifugal masses, it is possible to use the radially outward space saved for an additional centrifugal mass of the primary centrifugal mass.

16 Claims, 6 Drawing Sheets

FLYWHEEL AND CLUTCH SYSTEM FOR A MOTOR VEHICLE

BACKGROUND OF THE INVENTION

1. Field of the Invention

This invention generally relates to a flywheel of an internal combustion engine, wherein the flywheel has a reduced outside diameter. The flywheel has lugs which extend radially inward to facilitate the attachment of the flywheel to a clutch housing. So that a clutch disc can be installed and removed past the lugs, the clutch disc has friction linings which change continuously between a maximum outside diameter and a minimum outside diameter.

2. Background Information

Such a flywheel is disclosed, for example, in Unexamined German Patent Application No. 28 15 803. In this realization of a flywheel, the clutch housing is designed approximately in a cup shape. The clutch housing is bolted by means of a radial flange to a corresponding radial flange on the flywheel. The maximum outside diameter for the friction lining of the clutch disc can thus be determined by the fact that the cup-shaped clutch housing runs radially inside the bolt heads, and there typically must be a minimum clearance, preferably between the friction surfaces of the clutch disc and the thrust plate. Similar conditions result with a flywheel as disclosed in German Patent No. 21 61 432, where the flywheel is cup-shaped, and preferably in the cup-shaped portion, the bolts are installed for fastening the clutch housing to the flywheel. Here, too, there typically must be an appropriate distance between the cup-shaped portion of the flywheel, and the maximum outside diameter of the friction lining and thrust plate.

OBJECT OF THE INVENTION

The object of this invention, on flywheels of the type described above, is to make it possible, with a given maximum diameter of the friction linings of the clutch disc, to keep the outside diameter of the flywheel as small as possible.

SUMMARY OF THE INVENTION

The invention teaches that this object can be achieved by preferably configuring the flywheel to be approximately cup-shaped, and to preferably have a concentric wall, which wall can cover the clutch disc and friction linings with a small radial clearance. On the side of the clutch disc, facing away from the friction surface of the flywheel, there are preferably several lugs distributed over the circumference of the flywheel. The lugs run radially inward to a diameter area which is preferably smaller than the maximum outside diameter of the friction linings. The lugs can preferably have threads for insertion of threaded fasteners. Radial recesses are preferably disposed at least in the friction linings of the clutch disc, and possibly also in the lining spring segments, which recesses preferably correspond approximately to the axial projection of the lugs.

As a result of the configuration of the flywheel, clutch disc and thrust plate of the present invention, it can be possible to reduce the outside diameter of the flywheel, preferably without having to reduce the maximum outside diameter of the friction lining of the clutch disc, and having essentially no noticeable decrease in the torque transmitted by the friction clutch.

In accordance with an additional feature of the present invention, it can be advantageous if the external contour or diameter of the friction lining of the clutch disc changes continuously. That is, the external contour or diameter of the friction lining can preferably vary between a maximum outside diameter, which maximum outside diameter can preferably be somewhat smaller than the inside diameter of the concentric wall of the flywheel, and a minimum outside diameter, which minimum outside diameter can preferably be somewhat smaller than the inside diameter of the lugs. In this manner, it can be possible to manufacture the friction lining of the clutch disc preferably so that there are no large, sudden changes or shoulders in the outside diameter of the friction lining. Thus, the material of the friction lining can preferably be manufactured so that the material ranges from the maximum outside diameter to the minimum outside diameter in a preferably continuous manner. Although, in this instance, a negligible quantity of the friction lining may be wasted, the disadvantage of wasting some of the friction lining material can most likely be far outweighed by the advantages of the preferably continuous outside diameter of the friction lining material.

The invention also teaches that the thrust plate can have an outside diameter which can preferably be approximately equal to the maximum outside diameter of the friction lining of the clutch disc. The thrust plate can also preferably have recesses which can be approximately equal to the axial projection of the lugs of the flywheel. These recesses in the thrust plate can preferably be distributed along the circumference of the thrust plate. In this manner, it can be possible to cover the friction lining of the clutch disc to its largest diameter range, preferably by means of the thrust plate.

In a particularly advantageous configuration of the present invention, the radially inner generating curve of the envelope of the thread for the threaded fasteners can run essentially between the inside diameter of the concentric wall of the flywheel, and the maximum outside diameter of the friction lining of the clutch disc. That is, the channel, preferably for the insertion of the threaded fasteners, can preferably be disposed axially, between the concentric wall of the flywheel and the outermost portion of the friction lining of the clutch disc. With such a configuration, a very satisfactory compromise can be achieved, between the smallest possible outside diameter of the flywheel, and a small difference between the maximum and minimum outside diameter of the friction lining of the clutch disc. In other words, the outside diameter of the flywheel can be reduced to the smallest dimensions possible, and the amount of material which is removed from the friction linings of the clutch disc can be kept to a minimum.

The invention also teaches that there can be recesses which can extend radially, preferably in the concentric wall of the flywheel. The recesses can preferably be disposed on the circumference of the concentric wall between the lugs, into which recesses radial projections of ,the thrust plate can extend, which radial projections can preferably extend into, or have attached thereto, tangential leaf springs. The tangential leaf springs can then preferably be attached to the clutch housing, thereby fixing the thrust plate to the clutch housing. In this manner, it can be possible to easily achieve a more compact arrangement of the tangential leaf springs between the pressure plate and the clutch housing.

In one particularly advantageous application of the present invention, the portion of the flywheel of the present invention nearest the clutch disc can be designed preferably as a secondary centrifugal mass of a flywheel assembly having two centrifugal masses, whereby the primary centrifugal mass can preferably be fastened directly to the crankshaft of the internal combustion engine. The secondary centrifugal mass can be mounted by means of a bearing opposite the primary centrifugal mass, so that the secondary centrifugal mass can preferably be centered be rotatable. A torsion damping device can preferably be located between the primary centrifugal mass and the secondary centrifugal mass, and in the area radially outside the secondary centrifugal mass, in the vicinity of the concentric wall, there can preferably be a supplemental centrifugal mass, preferably associated with the primary centrifugal mass. The supplemental centrifugal mass of the primary centrifugal mass can preferably extend in an axial direction. As a result of the reduction of the outside diameter of the secondary centrifugal mass, which secondary centrifugal mass can be connected to the friction clutch, it can be possible, on a flywheel with two centrifugal masses as described above, to equip the primary centrifugal mass, preferably in the area radially outside the secondary centrifugal mass of the flywheel, with a supplemental or additional centrifugal mass, whereby with specified outside dimensions, the flywheel effect of the primary centrifugal mass can be increased.

One aspect of the invention resides broadly in a transmission system for a motor vehicle, the transmission system comprising: a flywheel having a circumference and a longitudinal axis, the circumference of the flywheel being disposed concentrically about the longitudinal axis; a clutch pressure plate releasably fastened to the flywheel; a clutch disc; the clutch disc being disposed between the clutch pressure plate and said flywheel; the clutch disc comprising: friction lining means; the friction lining means for contacting the clutch pressure plate and the flywheel; the clutch pressure plate being axially movable and for causing the clutch disc to engage and disengage with the flywheel; a clutch housing disposed adjacent the clutch pressure plate and being releasably attached to the flywheel; the flywheel having a disk-like portion extending from the longitudinal axis to the circumference; the flywheel comprising: wall means extending from the circumference of the flywheel substantially parallel to the longitudinal axis; the wall means having a first end and a second end; the first end of said wall means being adjacent the disk-like portion and the second end of said wall means extending away from the disk-like portion; at least one lug means extending inwardly from the second end of said wall means toward said longitudinal axis and substantially perpendicular to the longitudinal axis.

Another aspect of the invention resides broadly in a transmission system for a motor vehicle, the transmission system comprising: a flywheel having a circumference and a longitudinal axis, the circumference of the flywheel being disposed concentrically about the longitudinal axis; a clutch pressure plate releasably fastened to the flywheel; a clutch disc; the clutch disc being disposed between the clutch pressure plate and the flywheel; the clutch disc comprising: friction lining means; the friction lining means for contacting the clutch pressure plate and the flywheel; the clutch pressure plate being axially movable and for causing the clutch disc to engage and disengage with the flywheel; the flywheel having a disk-like portion extending from the longitudinal axis to the circumference; the flywheel comprising: wall means extending from the circumference of the flywheel substantially parallel to the longitudinal axis; the clutch disc having an outer perimeter disposed radially away from the longitudinal axis, wherein the clutch disc extends between the longitudinal axis and the outer perimeter; the clutch disc having an outer radial dimension defined between the longitudinal axis and the outer perimeter, the outer radial dimension being configured to vary between a maximum outer radial dimension and a minimum outer radial dimension, the minimum outer radial dimension being less than the maximum outer radial dimension.

Yet another aspect of the invention resides broadly in a method of assembling a manual transmission for a motor vehicle, the manual transmission comprising: a flywheel having a circumference and a longitudinal axis, the circumference of the flywheel being disposed concentrically about the longitudinal axis; a clutch pressure plate releasably fastened to the flywheel; a clutch disc; the clutch disc being disposed between the clutch pressure plate and the flywheel; the clutch disc comprising: friction lining means; the friction lining means for contacting the clutch pressure plate and the flywheel; the clutch pressure plate being axially movable and for causing the clutch disc to engage and disengage with the flywheel; a clutch housing disposed adjacent the clutch pressure plate and being releasably attached to the flywheel; the flywheel having a disk-like portion extending from the longitudinal axis to the circumference; the flywheel comprising: wall means extending from the circumference of the flywheel substantially parallel to the longitudinal axis; the wall means having a first end and a second end; the first end of the wall means being adjacent the disk-like portion and the second end of the wall means extending away from the disk-like portion; at least one lug means extending inwardly from the second end of the wall means toward the longitudinal axis and substantially perpendicular to the longitudinal axis; the clutch disc having an outer perimeter disposed radially away from the longitudinal axis, wherein the clutch disc extends between the longitudinal axis and the outer perimeter; the clutch disc having an outer radial dimension defined between the longitudinal axis and the outer perimeter, the outer radial dimension being configured to vary between a maximum outer radial dimension and a minimum outer radial dimension, the minimum outer radial dimension being less than the maximum outer radial dimension; the method comprising the steps of: providing a flywheel having a circumference and a longitudinal axis, the circumference of the flywheel being disposed concentrically about the longitudinal axis; providing a clutch pressure plate; releasably fastening the clutch pressure plate to the flywheel; providing a clutch disc; disposing the clutch disc between the clutch pressure plate and the flywheel; the step of providing the clutch disc comprising: providing friction lining means; configuring the friction lining means for contacting the clutch pressure plate and the flywheel; configuring the clutch pressure plate to be axially movable, the clutch pressure plate for causing the clutch disc to engage and disengage with the flywheel; providing a clutch housing; disposing the clutch housing adjacent the clutch pressure plate and releasably attaching the clutch housing to the flywheel; configuring the flywheel to have a disk-like portion, the disk-like portion of the flywheel extending from the longitudinal axis to the circumference; the providing of the flywheel comprising: providing wall means, the wall means extending from the circumference of the flywheel substantially parallel to the longitudinal axis; configuring the wall means to have a first end and a second end; disposing the first end of the wall means adjacent the disk-like portion and disposing the second end of the wall means away from the disk-like portion; providing at least one lug means; extending the at least one lug means inwardly from the second end of the wall means toward the longitudinal axis and substantially perpendicular to the longitudinal axis; configuring the clutch disc to have an outer perimeter, the outer perimeter being disposed radially away from the longitudinal axis, the clutch disc extending between the longitudinal axis and the outer perimeter; configuring the clutch disc to have an outer radial dimension defined between the longitudinal axis and the outer perimeter; configuring the outer radial dimension to vary between a maximum outer radial dimension and a minimum outer radial dimension, the minimum outer radial dimension being less than the maximum outer radial dimension; aligning the clutch disc with the at least one lug means so that the minimum outer radial dimension of the clutch disc substantially aligned with the at least one lug means.

BRIEF DESCRIPTION OF THE DRAWINGS

The invention is described in greater detail below, with reference to the embodiment illustrated in the accompanying drawings in which.

DESCRIPTION OF THE PREFERRED EMBODIMENT

The realization and operation of the present invention are explained in greater detail below with reference to the embodiments illustrated in FIGS. 1–4, which embodiment generally relates to a flywheel which can have two centrifugal masses, whereby the theoretical construction of the flywheel and the pressure plate can have the same advantages if these parts are fastened directly to a crankshaft.

Figure 1:
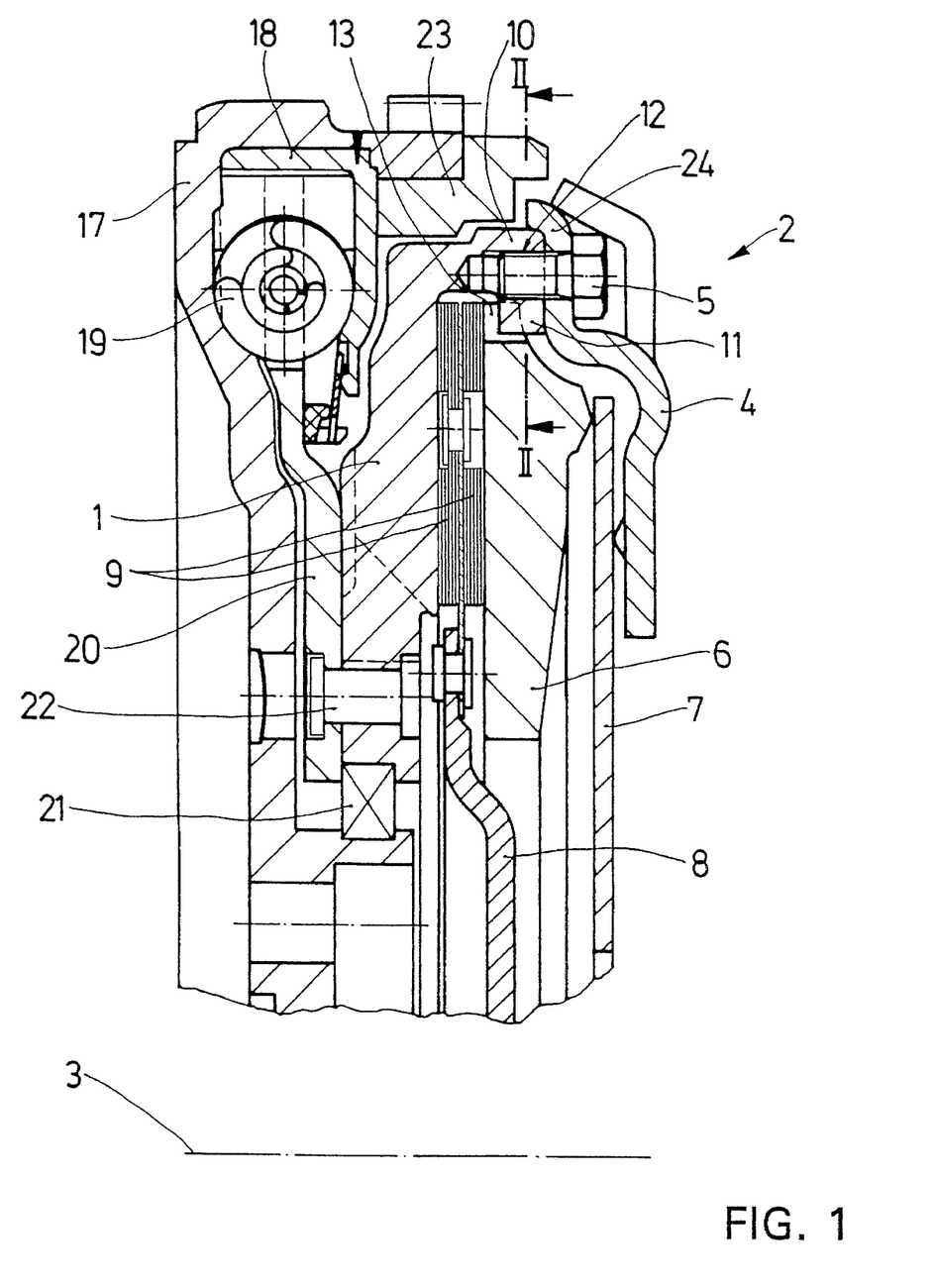
FIG. 1 shows the upper half through a longitudinal section of a flywheel with two centrifugal masses.

FIG. 1 shows a flywheel, preferably with two centrifugal masses, on which flywheel the primary centrifugal mass 17 can preferably be bolted directly to the crankshaft (not shown) of an internal combustion engine. The primary centrifugal mass 17 can preferably be disposed concentrically with respect to an axis of rotation 3. The primary centrifugal mass 17 can preferably include a cover 18, rigidly connected to the primary centrifugal mass 17. The primary centrifugal mass 17 and the cover 18 can thus form a torus-like chamber 18a (see FIG. 1a) preferably concentric to the axis of rotation 3, in which chamber 18a several coil springs 19 can be disposed. A hub disc 20 can extend into the torus-like space 18a, preferably in the radial direction, whereby the coil springs 19 can preferably be activated both by the hub disc 20, and by the primary centrifugal mass 17 and the cover 18. The hub disc 20 can preferably be rigidly connected with a flywheel 1, preferably in the radially inner portion of the hub disc 20, by means of rivets 22. Flywheel 1 is preferably part of a secondary centrifugal mass. The flywheel 1 can be supported in relation to the primary centrifugal mass 17 preferably by means of a bearing 21, but the flywheel 1 is preferably mounted so that it can rotate in relation to the primary centrifugal mass 17, preferably against the force of the coil springs 19.

On the flywheel 1, preferably in the radially outer portion of the flywheel 1, there can be an axially-extending concentric wall 10. The concentric wall 10 can surround the friction lining 9 of the clutch disc 8, preferably with a slight radial clearance. There can be a number of lugs 11 preferably disposed at an axial distance from a friction surface 9a (see FIG. 1a) between the friction lining 9 and the flywheel 1. The lugs 11 can preferably be distributed over the circumference of the concentric wall 10 and point radially inward. Threads 12 for the threaded fasteners 5 can preferably be located in the vicinity of the lugs 11.

The pressure plate 2 is preferably releasably fastened to the flywheel 1 by means of the threaded fasteners 5. The clutch housing 4 can thereby be equipped with a flange 24, which flange 24 can extend radially outward, and which flange 24 can be in contact with a corresponding radial surface 11a (see FIG. 1a) of the flywheel 1. The radial surface 11a of the flywheel 1 can preferably be formed by the concentric wall 10 and by the lugs 11. The pressure plate 2 preferably also has a thrust plate 6. The thrust plate 6 is preferably connected so that it is essentially torsionally stationary but can move axially, preferably with the clutch housing 4. The thrust plate 6 can then be pressurized by a membrane spring 7, which membrane spring 7 can preferably be braced both on the thrust plate 6 and also on the clutch housing 4.

Figure 1A:
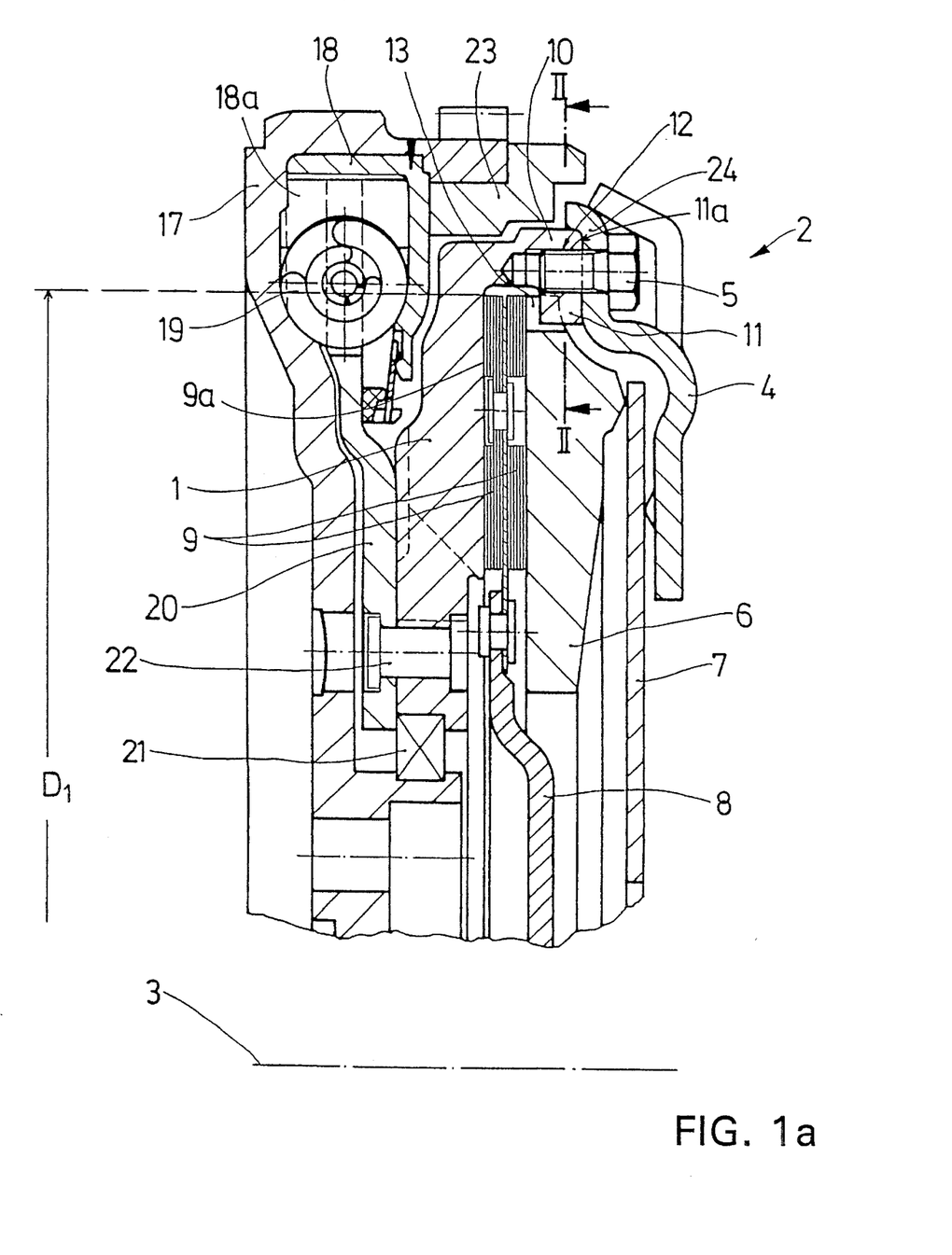
FIG. 1a shows substantially the same view as FIG. 1, but shows additional components.
Figure 1B:
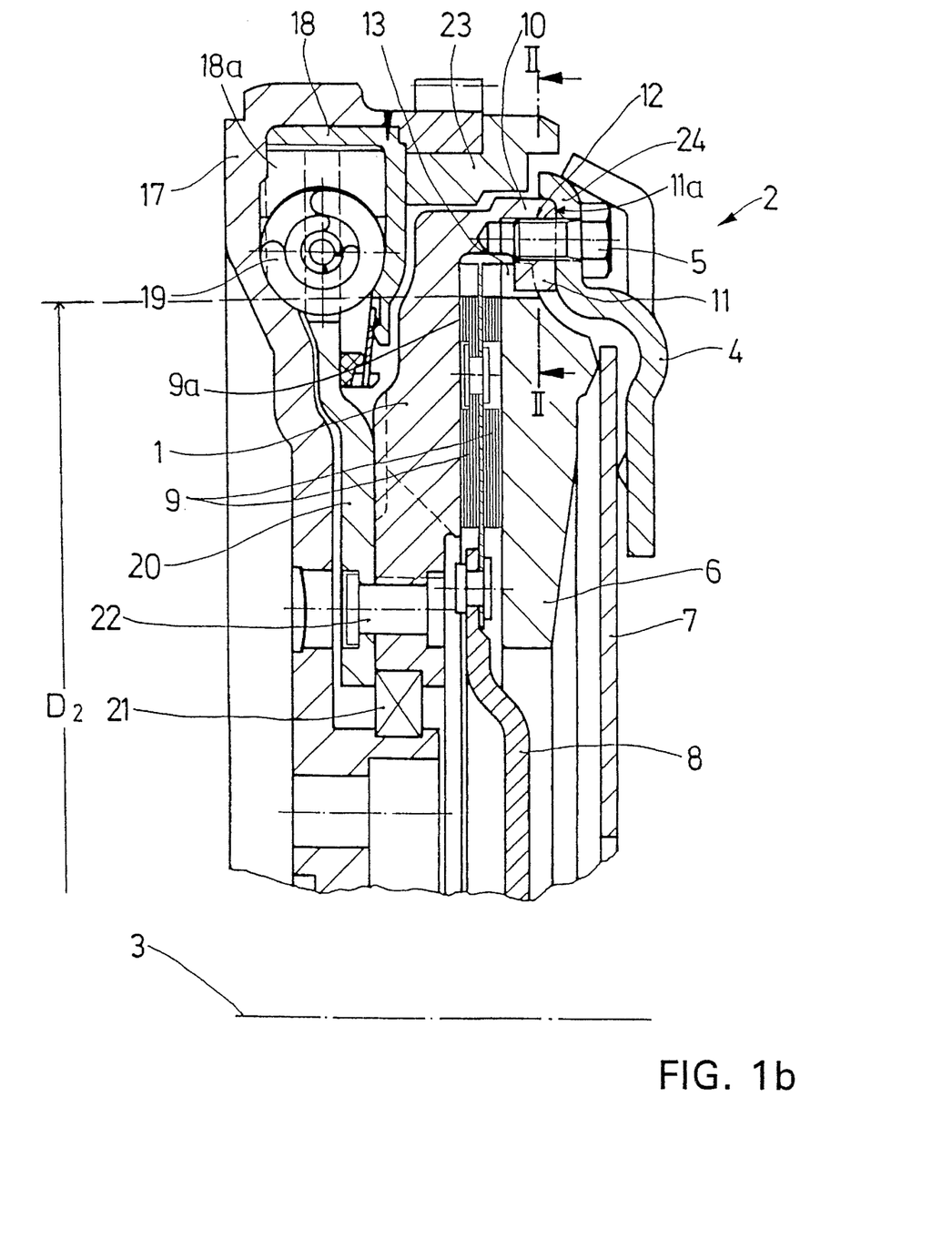
FIG. 1b shows substantially the same view as FIGS. 1 and 1a, but shows the friction linings of the clutch disc in alignment with the lugs.

FIG. 1b shows substantially the same view as FIGS. 1 and 1a, but shows the friction linings 9 of the clutch disc 8 essentially in alignment with the lugs 11. FIGS. 1 and 1a, on the other hand, essentially shows the friction linings 9 of the clutch disc 8 out of alignment with the lugs 11.

The number of lugs 11 preferably disposed along the circumference of the flywheel 1 can vary. However, in one preferred embodiment, four lugs 11 may be disposed along the flywheel 1 at 90° intervals. In another embodiment, six lugs 11 may be disposed along the flywheel 1 at 60° intervals. In still another embodiment, eight lugs 11 may be disposed along the flywheel 1 at 45° intervals. The number of projections 15, which preferably extend from the thrust plate 6 into the recesses between the lugs 11, can thus correspond to the number of lugs 11 present on the flywheel 1.

Figure 2:
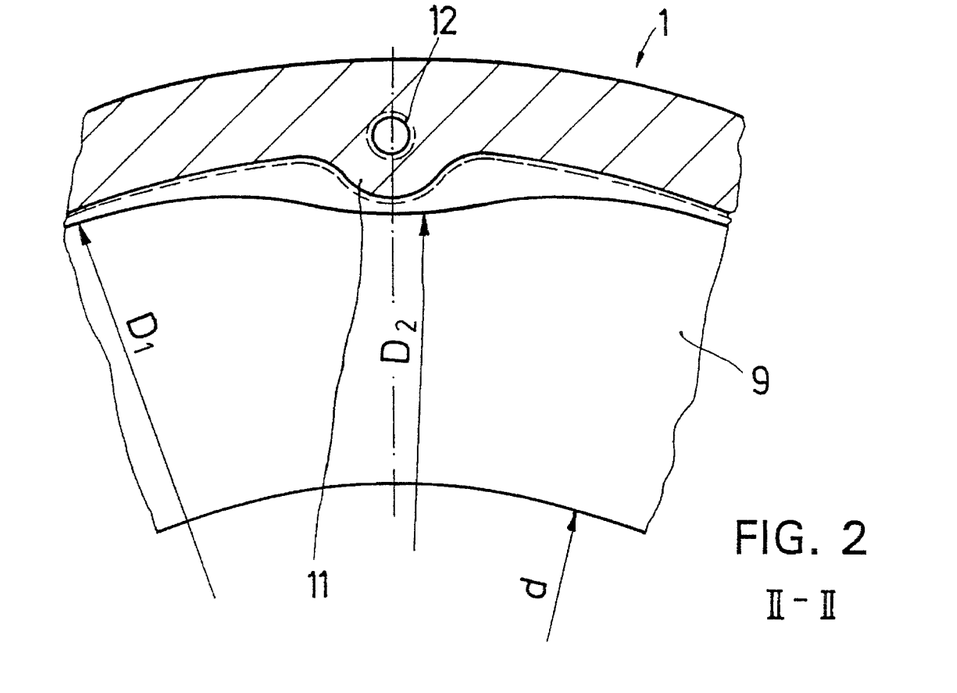
FIG. 2 shows a cross section along Line II—II in FIG. 1.

As shown in particular in FIG. 2, at least the friction linings 9 of the clutch disc 8, and also possibly the corresponding lining spring segments, can have a maximum outside diameter $D_1$, which maximum outside diameter $D_1$ is shown in cross section in FIG. 1, that is, FIG. 1 shows the maximum outside diameter $D_1$ of the friction linings 9 in cross section, when the friction linings 9 are out of alignment with the lugs 11 (see also FIG. 1a). So that the clutch disc 8 with the friction linings 9 can be installed, the outside diameter $D_1$ of the friction lining 9 should preferably be reduced at intervals to the minimum outside diameter $D_2$, preferably as a function of the number of lugs 11 located on the flywheel 1. The contour of the friction lining 9 can thereby run continuously between the two diameters $D_1$ and $D_2$, so that there can preferably be no interruption of the friction material of the friction linings 9 in the circumferential direction. The friction linings 9 can also have an inside diameter d which can run concentrically, unvaryingly, and essentially uninterrupted. Further, the thrust plate 6 can preferably have a contour similar to that of the friction linings 9, but the continuous transition from the maximum outside diameter to the minimum outside diameter of the thrust plate 6 may not be absolutely necessary. The contour of the thrust plate 6 can, for example, be defined as indicated by the broken line in FIG. 2. Thus, the thrust plate 6 can thereby have recesses 13 (See FIG. 1).

Figure 2A:
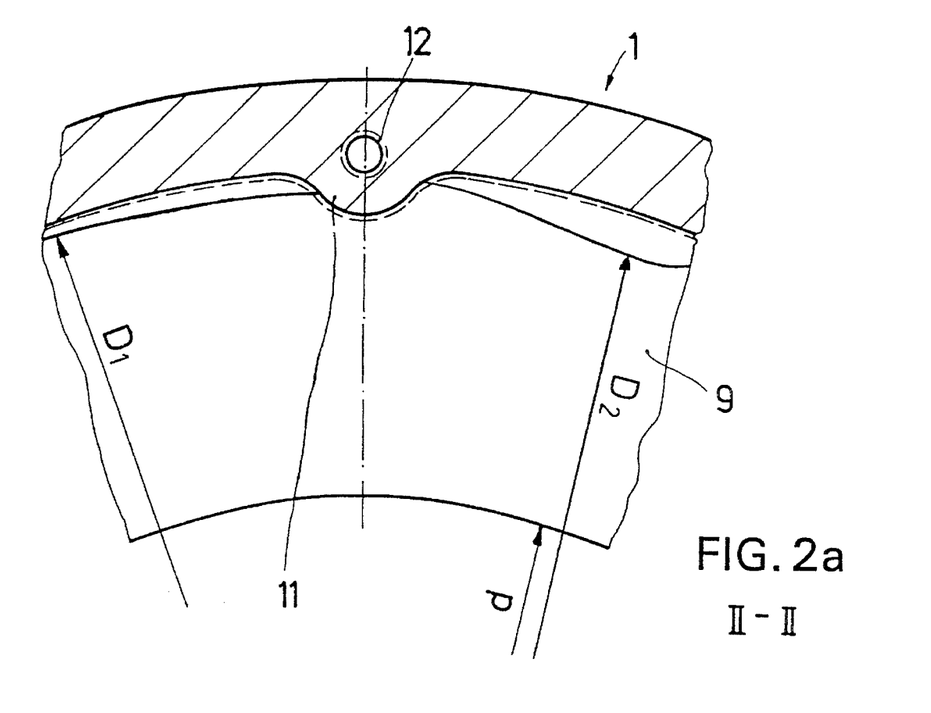
FIG. 2a shows substantially the same view as FIG. 2, but shows the friction linings of the clutch disc out of alignment with the lugs.

FIG. 2a shows substantially the same view as FIG. 2, but shows the friction linings 9 of the clutch disc 8 out of alignment with the lugs 11. This position of the friction linings 9 would most likely correspond to the position of the friction linings 9 shown in FIGS. 1 and 1a. FIG. 2, on the other hand, essentially shows the friction linings 9 of the clutch disc 8 in alignment with the lugs 11. This position of the friction linings 9 essentially corresponds to the position of the friction linings 9 shown in FIG. 1b.

Figure 3:
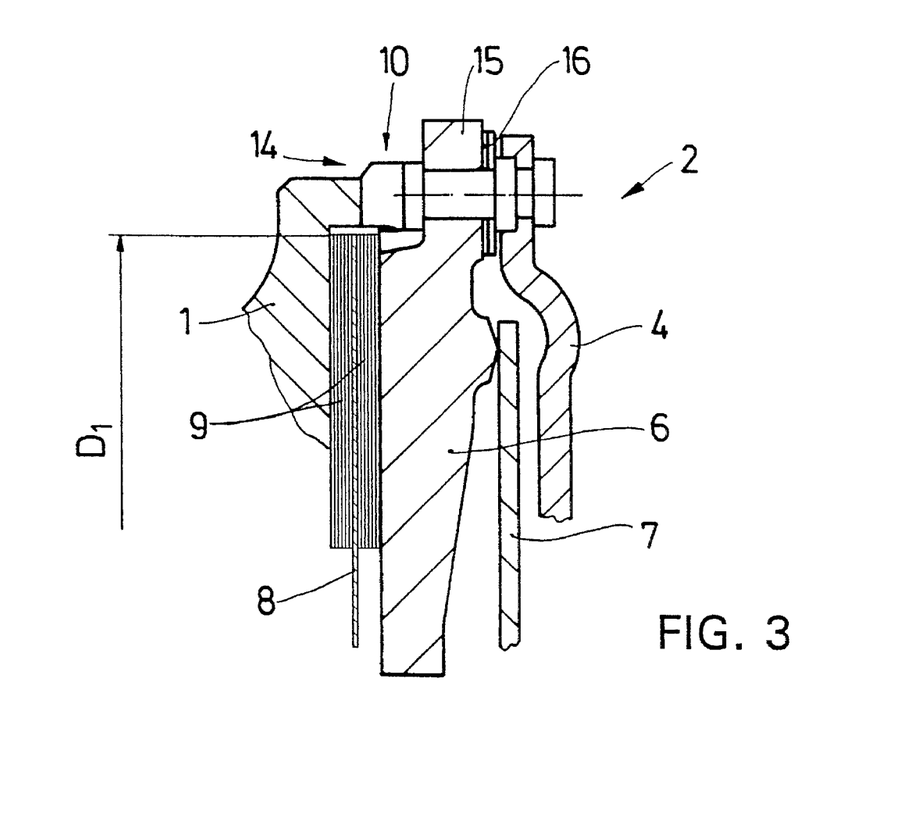
FIG. 3 shows a partial longitudinal section as illustrated in FIG. 1, from a different point of view on the circumference.

FIG. 3 shows a partial section which is somewhat pivoted in the circumferential direction with respect to the view shown in FIG. 1. FIG. 3 shows the portion of the thrust plate 6 which can produce the torsionally stationary, but axially movable, connection with the clutch housing 4. For this purpose, the thrust plate 6 can have projections 15 preferably pointing radially outward, to which projections 15 tangential leaf springs 16 can be attached by rivets 16a (see FIG. 3a). The tangential leaf springs 16 can extend in the circumferential direction, and the ends of the tangential leaf springs 16 can be then be riveted to the clutch housing 4. The concentric wall 10 of the flywheel 1 can have a recess or recesses 14 preferably in the vicinity of the radial projections 15 (see FIG. 3a). The cross section shown in FIG. 3 also shows the maximum outside diameter $D_1$ of the friction linings 9 of the clutch disc 8, which friction linings 9 can preferably extend radially outwardly close to the concentric wall 10, but radially inside the internal contour of the concentric wall 10.

Figure 3A:
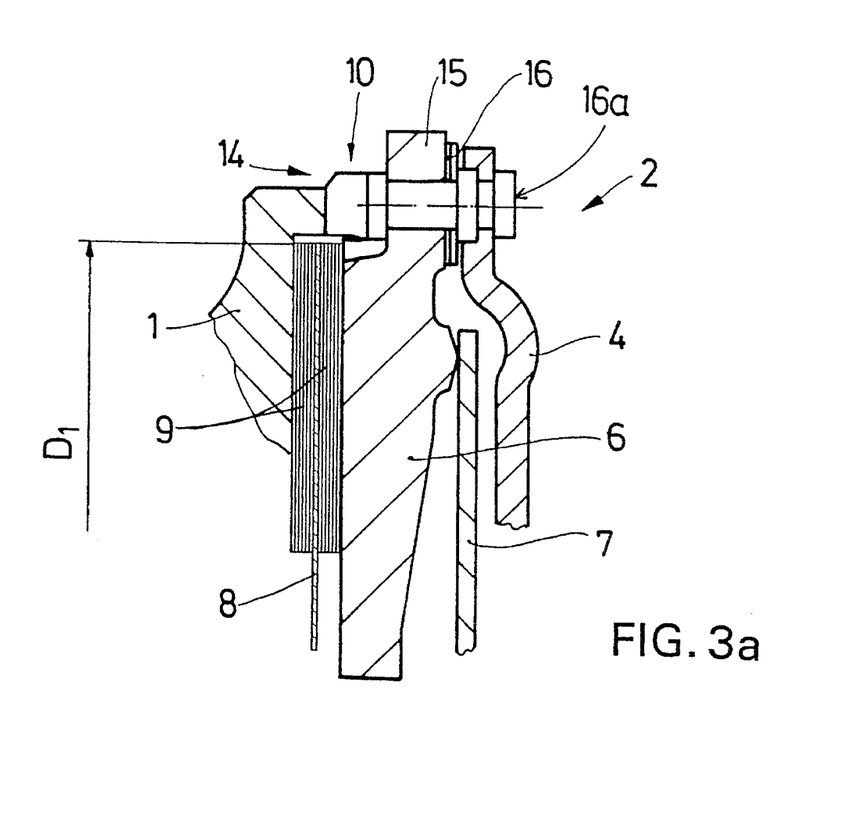
FIG. 3a shows substantially the same view as FIG. 3, but shows additional components.

FIG. 3a shows the substantially the same view as FIG. 3, but shows the view of FIG. 3 in more detail. In the preferred embodiment, the thrust plate 6 can preferably be attached to the clutch housing 4, preferably by means of tangential leaf springs 16, as described above. One end of the leaf spring 16 can preferably be attached to the clutch housing 4 by means of a rivet 16a. The other end of the leaf spring 16 can then preferably be attached to the thrust plate 6 by means of another rivet 16a. The projections 15 of the thrust plate 6 can thus preferably extend into the recesses 14 of the concentric wall 10.

Due to the arrangement of lugs 11, as best shown in FIGS. 1, 1a and 1b, which lugs 11 can extend radially inward on the flywheel 1, it can be possible to reduce the average diameter of the threaded fasteners 5, preferably between the flywheel 1 and the clutch housing 4, so that the outside diameter of the flywheel 1 can be reduced, at least in the vicinity of the concentric wall 10. From the axial overlap between the maximum outside diameter $D_1$ of the friction lining 9 of the clutch disc 8 and the lugs 11, it follows that the minimum outside diameter $D_2$ should be somewhat smaller than the diameter formed by the lugs 11. In this manner, the installation and removal of the clutch disc can be possible. A similar configuration of the outside diameter of the thrust plate 6 is highly desirable.

The external contour of the friction lining 9, which is no longer circular but is preferably scalloped, has virtually no effect on the torque transmission capability of such a friction clutch. Therefore, it can be possible to reduce the outside diameter of the flywheel of such a clutch, whereby, in particular in connection with a flywheel with two centrifugal masses as illustrated in FIG. 1, the advantage can be that, in the region radially outside the flywheel 1, an additional centrifugal mass 23 of the primary centrifugal mass 17 can be installed. It should also be noted that the clearance between the friction surface on the flywheel 1 and the internal contour of the lugs 11 should be sufficiently large so that the clearance of the clutch disc 8 can be essentially guaranteed at all times.

The additional centrifugal mass 23 can, in one embodiment, extend axially outward preferably from the primary centrifugal mass 17, and can be rigidly fastened to the primary centrifugal mass 17. The additional centrifugal mass 23 can follow the outward contour of the concentric wall 10, but preferably does not contact the concentric wall 10.

By reducing the outside diameter of the flywheel 1, as described above, additional space can be created in an area radially outside the flywheel 1. This space can be used for the installation of the additional centrifugal mass 23, as also described above. Alternatively, by reducing the diameter of the flywheel 1, it may be possible to use the free space for larger friction linings 9 of the clutch disc 8, as opposed to using the free space for the additional centrifugal mass 23. Thus, by reducing the outside diameter of the flywheel 1, the friction linings 9 could be made larger using essentially the same amount of space as was previously used up by the flywheel 1. Larger friction linings 9 may be desirable in automobiles with powerful engines for improved torque transmission. Larger friction linings 9 may also provide less clutch slippage. Another possible advantage of increasing the dimensions of the friction linings 9 may be to reduce the force needed from the throwout bearing (not shown) to engage the clutch disc 8. Thus, torque can be transmitted with less force.

Thus, the size of the friction linings 9 of the clutch disc 8 can be maximized, if desired, while utilizing a flywheel 1 of regular or standard dimensions.

Figure 4:
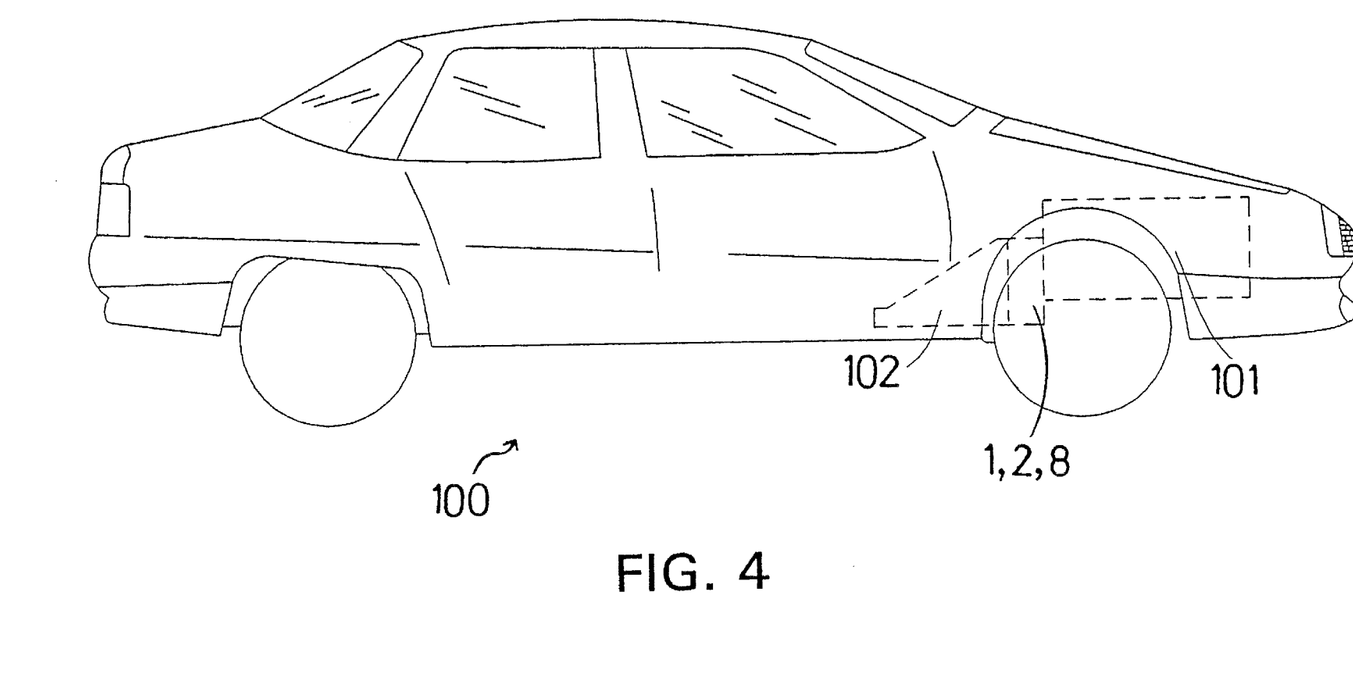
FIG. 4 shows a typical automobile in which the present invention may be incorporated.

FIG. 4 shows what could be considered to be a typical automobile 100, which automobile 100 typically includes an internal combustion engine 101, preferably mounted in the forward portion thereof. The automobile 100 could also typically include a transmission 102 for transmitting mechanical power from the engine 101 to the wheels. If the automobile 100 has a manual transmission 102, the flywheel 1, pressure plate 2, and clutch disc 8 of the present invention may also be included, for engaging the transmission 102 with the engine 101.

One feature of the invention resides broadly in the flywheel of an internal combustion engine, with a pressure plate of a motor vehicle friction clutch fastened releasably to it which defines an axis of rotation, comprising a clutch housing with a fastening flange directed radially outward in the vicinity of the outside diameter which is fastened, by means of several threaded fasteners located on the circumference on a diameter concentric to the axis of rotation, to a corresponding surface of the flywheel, a thrust plate in the clutch housing which is torsionally stationary but can be moved axially by a membrane spring, a clutch disc which can be braced with its friction linings between a friction surface of the flywheel and a friction surface of the thrust plate, characterized by the fact that the flywheel 1 is approximately cup-shaped, with a concentric wall 10 which covers the clutch disc 8 with the friction linings 9 with a small radial clearance, and on the side of the clutch disc 8 facing away from the friction surface of the flywheel 1, there are several lugs 11 distributed over the circumference and running radially inward to a diameter area smaller than the maximum outside diameter $D_1$ of the friction lining 9, whereby the threads 12 for the threaded fasteners are located in the lugs 11, and there are radial recesses located at least in the clutch disc (friction lining 9 and possibly also in the lining spring segments) which correspond approximately to the axial projection of the lugs 11.

Another feature of the invention resides broadly in the flywheel, characterized by the fact that the external contour of the friction lining 9 of the clutch disc 8 varies continuously between a maximum outside diameter $D_1$ which is somewhat smaller than the inside diameter of the concentric wall 10 of the flywheel 1, and a minimum outside diameter $D_2$ which is somewhat smaller than the inside diameter of the lugs 11.

Still another feature of the invention resides broadly in the flywheel, characterized by the fact that the thrust plate 6 has an outside diameter which is approximately equal to the maximum outside diameter $D_1$ of the friction lining 9 of the clutch disc 8, and there are recesses 13 which correspond approximately to the axial projection of the lugs 11 of the flywheel 1.

Yet another feature of the invention resides broadly in the flywheel, characterized by the fact that the radially inner generating curve of the envelope of the threads 12 for the threaded fasteners 5 runs essentially between the inside diameter of the concentric wall 10 of the flywheel 1 and the maximum outside diameter $D_1$ of the friction lining 9 of the clutch disc 8.

Still yet another feature of the invention resides broadly in the flywheel, characterized by the fact that in the concentric wall 10 in the flywheel 1, there are recesses running essentially radially 14 on the circumference between the lugs 11, into which radial projections 5 of the thrust plate 6 extend, which are connected by means of tangential leaf springs 16 to the clutch housing 4.

Yet still another feature of the invention resides broadly in the flywheel, characterized by the fact that it is designed as a secondary centrifugal mass of a flywheel with two centrifugal masses, whereby the primary centrifugal mass 17 is fastened directly to the crankshaft of the internal combustion engine, the secondary centrifugal mass flywheel 1 is fastened by means of a bearing 21 so that it is centered in relation to the primary centrifugal mass 17 and is mounted so that it can rotate, whereby a torsion damping device 19 is located between the two centrifugal masses, and in the area radially outside the secondary centrifugal mass flywheel 1—at least approximately in the vicinity of the concentric wall 10, there is a supplemental centrifugal mass 23 of the primary centrifugal mass flywheel 1 extending essentially axially.

Types of transmissions in which the present invention may be incorporated may be disclosed in the following U.S. Pat. Nos. 5,199,316 to Hoffman on Apr. 6, 1993, entitled "Fully-synchronized Multiple Speed Manual Transmission for Motor Vehicles"; 4,458,551 to Winter on Jul. 10, 1984, entitled "Manual Transmission"; and 3,858,460 to Porter et al. on Jan. 1, 1975, entitled "Four Speed Manual Transmission and Control".

Types of clutch assemblies may be disclosed in the following U.S. Pat. Nos. 4,684,007 to Maucher on Aug. 4, 1987, entitled "Clutch Plate"; 4,635,780 to Wiggen on Jan. 13, 1987, entitled "Clutch Disc for a Motor Vehicle Friction Clutch and 4,651,857 to Schraut et al. on Mar. 24, 1987, entitled "Clutch Disc Unit for a Motor Vehicle Clutch".

Types of two-mass flywheels may be disclosed in the following U.S. Pat. Nos. 5,103,688 to Kuhne on Apr. 14, 1992, entitled "Two-mass Flywheel"; and 4,777,843 to Bopp on Oct. 18, 1988, entitled "Two-mass Flywheel Assembly with Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 11 102, filed on Apr. 3, 1993, having inventors Bernhard Schierling and Hilmar Göbel, and DE-OS P 43 11 102 and DE-PS P 43 11 102, as well as their published equivalents are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A transmission system for a motor vehicle, said transmission system comprising:

a flywheel, said flywheel having a circumference and defining:

an axis of rotation; and an axial direction parallel to said axis of rotation;

said circumference of said flywheel being disposed substantially concentrically about said axis of rotation;

a clutch pressure plate releasably fastened to said flywheel;

a clutch disc;

said clutch disc being disposed between said clutch pressure plate and said flywheel;

said clutch disc comprising friction lining means;

said clutch pressure plate being axially movable and for causing said clutch disc to engage and disengage with said flywheel;

said friction lining means for contacting said clutch pressure plate and said flywheel during engagement of said clutch disc with said flywheel;

a clutch housing disposed adjacent said clutch pressure plate and being releasably attached to said flywheel;

said flywheel having a disk-like portion extending substantially from said axis of rotation to said circumference;

said flywheel comprising:

wall means extending from said circumference of said flywheel, said wall means being oriented substantially parallel to said axis of rotation;

said wall means having a first end and a second end;

said first end of said wall means being disposed adjacent said disk-like portion and said second end of said wall means being disposed away from said disk-like portion;

at least one lug means extending inwardly from said second end of said wall means towards said axis of rotation and in a direction substantially perpendicular to said axis of rotation;

fastening means; and said at least one lug means comprising means for receiving said fastening means, said fastening means being disposed in said receiving means for fastening said clutch housing to said flywheel.

2. The transmission system according to claim 1 wherein:

one of: said clutch disc and said friction lining means has an outer perimeter disposed radially away from said axis of rotation; and said outer perimeter has a maximum radial dimension and a minimum radial dimension, said outer perimeter being configured to vary between said maximum radial dimension and said minimum radial dimension, said minimum radial dimension being substantially less than said maximum radial dimension.

3. The transmission system according to claim 2 wherein said maximum radial dimension is disposed radially inwardly from said wall means to define a first radial clearance between said maximum radial dimension and said wall means.

4. The transmission system according to claim 3 wherein said minimum radial dimension is disposed radially inwardly from said at least one lug means to define a second radial clearance between said minimum radial dimension and said at least one lug means.

5. The transmission system according to claim 4 wherein:

said friction lining means comprises said outer perimeter; and said outer perimeter of said friction lining means is disposed at a varying radial dimension with respect to said axis of rotation, said varying radial dimension varies continuously and substantially smoothly between said minimum radial dimension and said maximum radial dimension.

6. The transmission system according to claim 5 wherein:

said clutch pressure plate comprises:
a thrust plate;
said thrust plate has:
an outer radial dimension substantially equivalent to said maximum radial dimension of friction lining means;
an inner radial dimension substantially equivalent to said minimum radial dimension of said friction lining means; and
at least one recess disposed at said inner radial dimension, said at least one lug means being disposed within at least a portion of said at least one recess.

7. The transmission system according to claim 6 wherein:

said wall means comprises:
an outer surface disposed at a radial distance from said maximum radial dimension of said friction lining means; and
an inner surface disposed adjacent said maximum radial dimension of said friction lining means;

said first radial clearance is defined between said inner surface of said wall means and said maximum radial dimension of said friction lining means; and said receiving means of said at least one lug means is disposed between said maximum radial dimension of said friction lining means and said outer surface of said wall means.

8. The transmission system according to claim 7 wherein:

said wall means of said flywheel and said disk-like portion of said flywheel together form a cup-like shape;

said at least one lug means comprises a plurality of lug means distributed at substantially equal intervals about the circumference of said wall means;

said at least one recess of said thrust plate comprises a plurality of recesses distributed at substantially equal intervals in said thrust plate, each of said plurality of lug means being disposed in a corresponding one of said plurality of recesses;

said flywheel further comprises a plurality of recesses, each of said plurality of recesses of said flywheel being disposed between adjacent ones of said plurality of lug means;

said thrust plate comprises a plurality of projections extending radially from said thrust plate and towards said wall means, said plurality of projections being disposed at said outer radial dimension of said thrust plate;

each of said plurality of projections is disposed within a corresponding one of said plurality of recesses of said flywheel;

said clutch housing comprises leaf spring means;

said leaf spring means having means for attaching said clutch housing to ones of said plurality of projections of said thrust plate;

said fastening means is a first fastening means;

said receiving means comprises a hole extending substantially parallel to said axis of rotation, said hole comprising a threaded portion;

said first fastening means comprises a portion having threads for engaging with said threaded portion of said hole of said receiving means;

said transmission system further comprises:
a primary centrifugal mass and a secondary centrifugal mass;
said flywheel comprises said secondary centrifugal mass;
said primary centrifugal mass comprising means for operatively attaching said primary centrifugal mass to a crankshaft of an internal combustion engine;
second means for fastening said primary centrifugal mass to said secondary centrifugal mass;
said second fastening means comprising:
bearing means for centering said secondary centrifugal mass with respect to said primary centrifugal mass and for permitting rotation of said secondary centrifugal mass;
damping means disposed between said primary centrifugal mass and said secondary centrifugal mass;
said primary centrifugal mass comprising a supplemental centrifugal mass disposed adjacent said wall means and extending in a direction substantially parallel to said axis of rotation;
a membrane spring for biasing said thrust plate towards said flywheel;
said membrane spring is disposed between said clutch housing and said thrust plate;

said supplemental centrifugal mass is disposed immediately adjacent said outer surface of said wall means;

said flywheel further comprises a friction surface; and said thrust plate further comprises a friction surface for engaging with said friction surface of said flywheel during engagement of said clutch disc.

9. A transmission system for a motor vehicle, said transmission system comprising:

a flywheel, said flywheel having a circumference and defining:
an axis of rotation; and
an axial direction parallel to said axis of rotation;

said circumference of said flywheel being disposed substantially concentrically about said axis of rotation;

a clutch pressure plate releasably fastened to said flywheel;

a clutch disc;

said clutch disc being disposed between said clutch pressure plate and said flywheel;

said clutch disc comprising friction lining means;

said clutch pressure plate being axially movable and for causing said clutch disc to engage and disengage with said flywheel;

said friction lining means for contacting said clutch pressure plate and said flywheel during engagement of said clutch disc with said flywheel;

a clutch housing disposed adjacent said clutch pressure plate and being releasably attached to said flywheel;

said flywheel having a disk-like portion extending substantially from said axis of rotation to said circumference;

said flywheel comprising:

wall means extending from said circumference of said flywheel, said wall means being oriented substantially parallel to said axis of rotation;

said wall means having a first end and a second end, said first end of said wall means being disposed adjacent said disk-like portion and said second end of said wall means being disposed away from said disk-like portion;

said flywheel further comprises:
at least one lug means extending inwardly from said second end of said wall means towards said axis or rotation and in a direction substantially perpendicular to said axis of rotation;

one of: said clutch disc and said friction lining means having an outer perimeter disposed radially away from said axis of rotation;

said outer perimeter having a maximum radial dimension and a minimum radial dimension, said outer perimeter being configured to vary between said maximum radial dimension and said minimum radial dimension, said minimum radial dimension being substantially less than said maximum radial dimension;

said maximum radial dimension being disposed radially inwardly from said wall means to define a first radial clearance between said maximum radial dimension and said wall means;

said flywheel further comprising fastening means; and said at least one lug means comprising means for receiving said fastening means, said fastening means being disposed in said receiving means for fastening said clutch housing to said flywheel.

10. The transmission system according to claim 9 wherein:

said friction lining means comprises said outer perimeter;

said outer perimeter of said friction lining means is disposed at a varying radial distance with respect to said axis of rotation, said varying radial distance varies continuously and substantially smoothly between said minimum radial dimension and said maximum radial dimension; and said minimum radial dimension is disposed radially inwardly from said at least one lug means to define a second radial clearance between said minimum radial dimension and said at least one lug means.

11. The transmission system according to claim 10 wherein:

said clutch pressure plate comprises:
a thrust plate;
said thrust plate has:
an outer radial dimension substantially equivalent to said maximum radial dimension of said friction lining means;
an inner radial dimension substantially equivalent to said minimum radial dimension of said friction lining means; and
at least one recess disposed at said inner radial dimension, said at least one lug means being disposed within at least a portion of said at least one recess.

12. The transmission system according to claim 11 wherein:

said wall means comprises:
an outer surface disposed at a radial distance from said maximum radial dimension of said friction lining means; and
an inner surface disposed adjacent said maximum radial dimension of said friction lining means;

said first radial clearance is defined between said inner surface of said wall means and said maximum radial dimension of said friction lining means; and said receiving means of said at least one lug means is disposed between said maximum radial dimension of said friction lining means and said outer surface of said wall means.

13. The transmission system according to claim 12 wherein:

said wall means of said flywheel and said disk-like portion of said flywheel together form a cup-like shape;

said at least one lug means comprises a plurality of lug means distributed at substantially equal intervals about the circumference of said wall means;

said at least one recess of said thrust plate comprises a plurality of recesses distributed at substantially equal intervals in said thrust plate, each of said plurality of lug means being disposed in a corresponding one of said plurality of recesses;

said flywheel further comprises a plurality of recesses, each of said plurality of recesses of said flywheel being disposed between adjacent ones of said plurality of lug means;

said thrust plate comprises a plurality of projections extending radially from said thrust plate and towards said wall means, said plurality of projections being disposed at said outer radial dimension of said thrust plate;

each of said plurality of projections is disposed within a corresponding one of said plurality of recesses of said flywheel;

said clutch housing comprises leaf spring means;

said leaf spring means having means for attaching said clutch housing to ones of said plurality of projections of said thrust plate;

said fastening means is a first fastening means;

said receiving means comprises a hole extending substantially parallel to said axis of rotation, said hole comprising a threaded portion;

said first fastening means comprises a portion having threads for engaging with said threaded portion of said hole of said receiving means;

said transmission system further comprises:
a primary centrifugal mass and a secondary centrifugal mass;
said flywheel comprises said secondary centrifugal mass;
said primary centrifugal mass comprising means for operatively attaching said primary centrifugal mass to a crankshaft of an internal combustion engine;
second means for fastening said primary centrifugal mass to said secondary centrifugal mass;
said second fastening means comprising:
bearing means for centering said secondary centrifugal mass with respect to said primary centrifugal mass and for permitting rotation of said secondary centrifugal mass;
damping means disposed between said primary centrifugal mass and said secondary centrifugal mass;
said primary centrifugal mass comprising a supplemental centrifugal mass disposed adjacent said wall means and extending in a direction substantially parallel to said axis of rotation;
a membrane spring for biasing said thrust plate towards said flywheel;
said membrane spring is disposed between said clutch housing and said thrust plate;
said supplemental centrifugal mass is disposed immediately adjacent said outer surface of said wall means;
said flywheel further comprises a friction surface; and
said thrust plate further comprises a friction surface for engaging with said friction surface of said flywheel during engagement of said clutch disc.

14. A method of assembling a manual transmission for a motor vehicle, the manual transmission comprising: a flywheel having a circumference and defining: an axis of rotation; and an axial direction parallel to the axis of rotation, the circumference of the flywheel being disposed substantially concentrically about the axis of rotation; a clutch pressure plate releasably fastened to the flywheel; a clutch disc; the clutch disc being disposed between the clutch pressure plate and the flywheel; the clutch disc comprising friction lining means; the clutch pressure plate being axially movable and for causing the clutch disc to engage and disengage with the flywheel; the friction lining means for contacting the clutch pressure plate and the flywheel during engagement of the clutch disc; a clutch housing disposed adjacent the clutch pressure plate and being releasably attached to the flywheel; the flywheel having a disk-like portion extending substantially from the axis of rotation to the circumference; the flywheel comprising: wall means extending from the circumference of the flywheel, the wall means being oriented substantially parallel to the axis of rotation; the wall means having a first end and a second end; the first end of the wall means being disposed adjacent the disk-like portion and the second end of the wall means being disposed away from the disk-like portion; at least one lug means extending inwardly from the second end of the wall means toward the axis of rotation and in a direction substantially perpendicular to the axis of rotation; one of: the clutch disc and the friction lining means having an outer perimeter disposed radially away from the axis of rotation; the outer perimeter has a maximum radial dimension and a minimum radial dimension, the outer perimeter being configured to vary between the maximum radial dimension and the minimum radial dimension, the minimum radial dimension being substantially less than the maximum radial dimension;

said method comprising the steps of:
providing a flywheel having a circumference and defining an axis of rotation and an axial direction parallel to the axis of rotation, the circumference of the flywheel being disposed concentrically about the axis of rotation;
providing a clutch pressure plate;
releasably fastening the clutch pressure plate to the flywheel;
providing a clutch disc;
disposing the clutch disc being between the clutch pressure plate and the flywheel;
said step of providing the clutch disc comprising:
providing friction lining means;
configuring the friction lining means for contacting the clutch pressure plate and the flywheel during engagement of the clutch disc with the flywheel;
configuring the clutch pressure plate to be axially movable, the clutch pressure plate for causing the clutch disc to engage and disengage with the flywheel;
providing a clutch housing;
disposing the clutch housing adjacent the clutch pressure plate and releasably attaching the clutch housing to the flywheel;
configuring the flywheel to have a disk-like portion, the disk-like portion of the flywheel extending substantially from the axis of rotation to the circumference;
said step of providing of the flywheel comprises:
providing Wall means, the wall means extending from the circumference of the flywheel, the wall means being oriented substantially parallel to the axis of rotation;
configuring the wall means to have a first end and a second end;
disposing the first end of the wall means adjacent the disk-like portion and disposing the second end of the wall means away from the disk-like portion;
providing at least one lug means;
extending the at least one lug means inwardly from the second end of the wall means towards the axis of rotation and in a direction substantially perpendicular to the axis of rotation;
configuring one of: the clutch disc and the friction lining means to have an outer perimeter, the outer perimeter being disposed radially away from the axis of rotation;
configuring the outer perimeter to have a maximum radial dimension and a minimum radial dimension;
configuring the outer perimeter to vary between the maximum radial dimension and the minimum radial dimension, the minimum radial dimension being substantially less than the maximum radial dimension; and
aligning one of: the clutch disc and the friction lining means with the at least one lug means such that the minimum radial dimension is substantially aligned with the at least one lug means.

15. The method of assembling according to claim 14 further including:
said step of providing the flywheel further comprises providing fastening means;
said step of providing the at least one lug means further comprises providing means for receiving the fastening means;

disposing the fastening means in the receiving means and fastening the clutch housing to the flywheel;

disposing the maximum radial dimension radially inwardly from the wall means and defining a first radial clearance between the maximum radial dimension and the wall means;

disposing the minimum radial dimension radially inwardly from the at least one lug means and defining a second radial clearance between the minimum dimension and the at least one lug means;

said step of configuring one of: the clutch disc and the friction lining means to have an outer perimeter comprises:
configuring the friction lining means to comprise the outer perimeter;

configuring the outer perimeter of the friction lining means such that the outer perimeter is disposed at a varying radial distance with respect to the axis of rotation, the varying radial distance varying continuously and substantially smoothly between the minimum radial dimension and the maximum radial dimension;

said step of providing the clutch pressure plate further comprises providing a thrust plate;

configuring the thrust plate to have an outer radial dimension substantially equivalent to the maximum radial dimension of the friction lining means;

configuring the thrust plate to have an inner radial dimension substantially equivalent to the minimum radial dimension of the friction lining means;

configuring the thrust plate to have at least one recess;

disposing the at least one recess at the inner radial dimension;

disposing the at least one lug means in a portion of the at least one recess;

configuring the wall means to have an outer surface, the outer surface for being disposed at a radial distance away from the maximum radial dimension of the friction lining means;

configuring the wall means to have an inner surface, the inner surface for being disposed adjacent the maximum radial dimension of the friction lining means, the first radial clearance being defined between the inner surface of the wall means and the maximum radial dimension of the friction lining means;

disposing the receiving means between the maximum radial dimension of the friction lining means and the outer surface of the wall means;

forming a cup-like shape with the wall means and the disk-like portion of the flywheel;

said step of providing the at least one lug means comprises providing a plurality of lug means and distributing the plurality of at least one lug means at substantially equal intervals about the circumference of the wall means;

said step of providing the at least one recess of the thrust plate comprises providing a plurality of recesses and disposing the plurality of recesses of the thrust plate at substantially equal intervals in the thrust plate;

disposing each of the plurality of lug means in a corresponding one of the plurality of recesses of the thrust plate;

said step of providing the flywheel further comprises forming a plurality of recesses between adjacent ones of the plurality of lug means;

disposing ones of the plurality of recesses of the flywheel between adjacent ones of the plurality of lug means;

configuring the thrust plate to have a plurality of projections;

extending the plurality of projections radially from the thrust plate and towards the wall means and disposing the plurality of projections at the outer radial dimension of the thrust plate;

disposing ones of the plurality of projections within corresponding ones of the plurality of recesses of the flywheel;

said step of providing the clutch housing comprising providing leaf spring means, the leaf spring means having means for attaching the clutch housing to ones of the plurality of projections of the thrust plate;

attaching the clutch housing to the plurality of projections of the thrust plate by means of the leaf spring means;

the fastening means is a first fastening means;

said step of providing the receiving means comprises:
forming a hole, the hole extending substantially parallel to the axis of rotation;
configuring the hole to comprise a threaded portion; and said step of providing the first fastening means comprises:
configuring the first fastening means to comprise a portion having threads for engaging with the threaded portion of the receiving means.

16. The method of assembling according to claim 15 wherein said method further comprises the steps of:

providing a primary centrifugal mass and a secondary centrifugal mass;

configuring the flywheel to comprise the secondary centrifugal mass;

configuring the primary centrifugal mass for being engaged with a crankshaft of an internal combustion engine;

providing second means for fastening the primary centrifugal mass to the secondary centrifugal mass;

fastening the primary centrifugal mass to the secondary centrifugal mass with the second fastening means;

said providing of the secondary centrifugal mass comprising providing bearing means;

centering the secondary centrifugal mass with respect to the primary centrifugal mass and permitting the rotation of said secondary centrifugal mass by means of the bearing means;

providing damping means;

disposing the damping means between the primary centrifugal mass and the secondary centrifugal mass;

said providing of the primary centrifugal mass comprises forming a supplemental centrifugal mass;

disposing the supplemental centrifugal mass adjacent the wall means, the supplemental centrifugal mass extending in a direction substantially parallel to the axis of rotation;

providing a membrane spring, disposing the membrane spring between the clutch housing and the thrust plate;

biasing the thrust plate towards the flywheel with the membrane spring;

disposing the supplemental centrifugal mass immediately adjacent the outer surface of the wall means;

configuring the flywheel to comprises a friction surface; and configuring the thrust plate to have a friction surface for engaging with the friction surface of the flywheel during engagement of the clutch disc.

* * * * *